(12) United States Patent
Sindhu

(10) Patent No.: US 6,826,309 B2
(45) Date of Patent: Nov. 30, 2004

(54) PREFILTERING FOR SEGMENTED IMAGE COMPRESSION

(75) Inventor: Pradeep Sindhu, Los Altos Hills, CA (US)

(73) Assignee: Xerox Corporation, Stamford, CT (US)

( * ) Notice: Subject to any disclaimer, the term of this patent is extended or adjusted under 35 U.S.C. 154(b) by 607 days.

(21) Appl. No.: 09/871,505

(22) Filed: May 31, 2001

(65) Prior Publication Data

US 2002/0191858 A1 Dec. 19, 2002

(51) Int. Cl.$^7$ .............................. G06K 9/34; G06K 9/40; G06T 7/40
(52) U.S. Cl. ..................... 382/261; 382/108; 382/173; 382/276; 358/2.1; 358/3.27
(58) Field of Search ................. 382/261, 108, 382/173, 276; 358/2.1, 3.27

(56) References Cited

U.S. PATENT DOCUMENTS

| | | | | |
|---|---|---|---|---|
| 4,941,191 A | * | 7/1990 | Miller et al. ................. | 382/261 |
| 5,065,444 A | * | 11/1991 | Garber ......................... | 382/275 |
| 5,440,344 A | * | 8/1995 | Asamura et al. ........ | 375/240.04 |
| 6,052,484 A | * | 4/2000 | Kobayashi ................... | 382/195 |
| 6,175,650 B1 | | 1/2001 | Sindhu et al. .............. | 382/171 |
| 6,424,741 B1 | * | 7/2002 | Shin et al. ................... | 382/170 |
| 2003/0112877 A1 | * | 6/2003 | Lee et al. ............... | 375/240.29 |

* cited by examiner

Primary Examiner—Leo Boudreau
Assistant Examiner—Patrick Edwards
(74) Attorney, Agent, or Firm—Fliesler Meyer LLP (57) ABSTRACT

A method of prefiltering is applied before data compression of scanned image data to better preserve important information. Before prefiltering, the image is segmented and tagged as belonging in a first region, such as a Lineart region, in which edges are the most important information, or a second region, such as a Contone or Halftone Region, in which pixel level is the most important information. For prefiltering, dynamic filters condition the image data passing into the two compressors. Each filter attempts to suppress noise associated with its particular channel by applying a smoothing filter, no filter or a sharpening filter based on segmentation tags and other characteristics of the data.

2 Claims, 5 Drawing Sheets

A constantly increasing row of pixels produces 0 texture

FIG. 3

A step function produces 2 as the value of texture

| 1 | 2 | 1 |
|---|---|---|
| 2 | 4 | 2 |
| 1 | 2 | 1 |

FIG. 7

| Endpoints of TCR Range | | Tag |
|---|---|---|
| (t0, c0, r0) | (t1, c1, r1) | 0010 |
| (t2, c2, r2) | (t3, c3, r3) | 0110 |
| (t4, c4, r4) | (t5, c5, r5) | 0010 |
| (t6, c6, r6) | (t7, c7, r7) | 1010 |
| ⋮ | | |
| (t6, c6, r6) | (t7, c7, r7) | 0100 |

*Table for Computing Tag from (t, c, r)*

PREFILTERING FOR SEGMENTED IMAGE COMPRESSION

BACKGROUND OF THE INVENTION

1. Field of the Invention

The present invention relates to a method for prefiltering image data to so that data compression can be preformed while better preserving important information.

2. Description of the Related Art

I. Acquiring Image by Scanning

Digital document systems typically capture an image by sampling it at regularly spaced points on a two-dimensional grid. Each sample point is represented by the value of the intensity at that point for black-and-white scanners, and as three values for the intensities of red, blue, and green for color scanners. Depending on the quality desired, the number of bits per value varies from 4 to 12 and the number of samples per inch varies anywhere from 100 per inch for low quality scanners to over 2000 per inch for very high quality scanners. Typical commercial scanners for businesses documents operate at 8 bits per pixel and 300–600 samples per inch (spi) For a 300 spi scanner, a single 8.5×11 inch page represents approximately 8.5 million bytes of data for a raw scanned image. For a 600 spi scanner, this increases to 33.7 million bytes. Given this large data size, a key problem for document systems is to find compact ways of encoding the data for storage and transmission while still being able to reproduce the image from the encoded form at a quality commensurate with that of the scanned image.

II. Compression Techniques

To reduce the amount of memory space required to store a scanned image, compression techniques can be applied to the scanned image before the image data is stored. Some techniques for compressing images use a single algorithm over the whole image. Examples of such algorithms are the CCITT G3 and G4 bitmap compression algorithms, JBIG and JPEG. These algorithms have been designed to work well on particular classes of images, but will not work well across all classes. For example, CCITT G3 and G4 work well with bitmaps representing text or line-art, while JPEG is designed for encoding photographs which typically contain smooth changes from one pixel to the next. Typical documents, however, contain a mixture of textual and pictorial material on the same page. As a result using a single compression algorithm on the whole page represents a poor compromise between the size of the compressed image and the quality of the image that can be reproduced from it.

A different approach for compressing image data containing more than one class of images is to use segmentation to divide the image into disjoint regions and compress each region using an algorithm suited to that region. Such a compression technique is disclosed in U.S. patent application Ser. No. 09/013,480 entitled "Adaptive Quantization Compatible With The JPEG Baseline Sequential Mode", to Sindhu.

III. Image Types

In the images typically encountered by digital document processing systems, there are at least four types of regions including: Flat, LineArt, Halftone and Contone.

Flat regions correspond to image background, have no visible detail, and are typically either white or some other lighter color. Flat regions are interesting because they can be encoded very efficiently, and overall image quality can be improved significantly by eliminating the "salt and pepper" noise that is sometimes present in such regions.

Lineart regions correspond to text and other sharp edge features such as line drawings or filled shapes. Lineart is interesting to separate out because it can be compressed efficiently using lossless binary algorithms, and its quality can be improved by enhancing edges and enforcing the use of two colors (typically black and white) during rendering.

Finally, Halftone and Contone regions correspond to the pictorial parts of an image which are best compressed with algorithms such as JPEG. Halftone regions are those where the pictorial was produced using a printing process that has a small number of distinct color separations available (typically 5 or less) and so the impression of smooth changes in intensity and color was created by using half-tone dots or error diffusion. Contone regions, on the other hand, are those that were printed using a process such as photography that can produce continuous changes in color and intensity. Although JPEG can be used to compress both Halftone and Contone regions, substantial gains can be made in compression ratio by tuning the algorithm's parameters to the type or region. Furthermore, the rendering algorithms that can render Halftone regions well are different from those that can render Contone regions well, so it is interesting to distinguish between them from a rendering standpoint as well.

IV. Texture

A fundamental property of images that is important in helping to discriminate between the four basic regions is texture. Intuitively, texture is simply the small-scale patterning that gives an image its feel of being more or less "busy". Flat regions, which are essentially featureless have the smallest texture. Contone regions where there are smooth variations from one pixel to the next have higher texture. Lineart regions with frequent sharp changes come next. Finally Halftone regions have the highest texture because of the presence of halftone or error diffusion dots.

A function to identify the texture of components of a scanned image can be used to discriminate between the four basic categories of regions. Tags can be linked to the image regions to identify the category which the image data falls into. Different compression techniques can then be used which are best suited to each category of image depending on the tag applied to the region as described in U.S. patent application Ser. No. 09/013,480.

SUMMARY OF THE INVENTION

Before an image is compressed, the image is segmented and tagged as belonging in a first region, such as a Lineart region, in which edges are the most important information, or a second region, such as a Contone or Halftone Region, in which pixel level is the most important information.

In accordance with the present invention, prior to compression dynamic filters condition the image data passing into the two compressors. Each filter attempts to suppress noise associated with its particular channel by applying a smoothing filter, no filter or a sharpening filter based on segmentation tags and other characteristics of the data. The net effect is improved compression with good image quality.

BRIEF DESCRIPTION OF THE DRAWINGS

Further details of the present invention are explained with the help of the attached drawings in which.

DETAILED DESCRIPTION

I. Texture Computation

Once an image is scanned, texture for the array can be determined by thresholding second order differences between neighboring pixels. More details of how texture is determined is described below.

Figure 1:
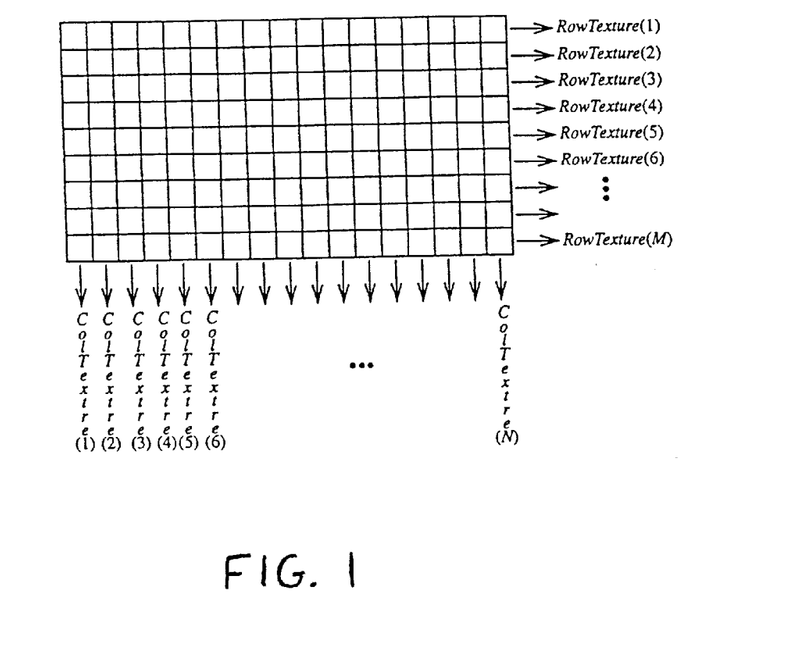
FIG. 1 illustrates texture arrays determined for a block of pixels.

The texture for an arbitrary M×N block of image data is defined as (ΣRowTexture (i)+ΣColumnTexture (j)). RowTexture and ColTexture are one dimensional arrays defined along the horizontal and vertical directions in an M×N block. FIG. 1 illustrates this definition for Texture.

Figure 2:
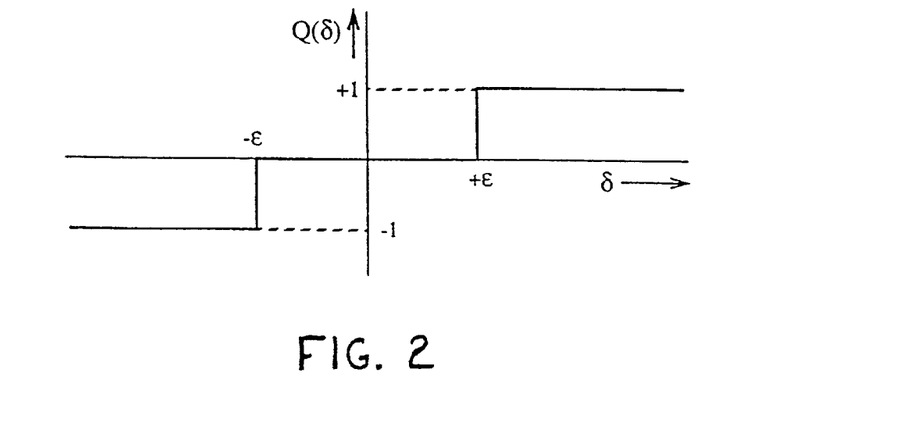
FIG. 2 illustrates the function $Q(\delta)$ used to make the definition of texture insensitive to background noise.

The one dimensional functions RowTexture and ColTexture are next defined. Let $p(1), p(2), \ldots p(N)$ be a 1×N block of pixels. Then the RowTexture for this block is computed as follows. First, the N pixel values are used to compute the differences $\delta(1), \delta(2), \ldots, \delta(N-1)$ between successive pixels where $\delta(i)$ is defined as $p(i+1)-p(i)$. Each $\delta(i)$ is then quanitized using the function $Q(\delta)$ shown in FIG. 2 to make the definition of texture insensitive to background noise.

The output of the quantization function Q is either −1, 0 or +1 depending on whether the value of its input δ is less than −ε and ε, or greater than +ε. The parameter of ε of Q is a measure of the amount of pixel to pixel noise that should be ignored in the computation of Texture. If such background page noise is not ignored, the entire image will have high texture and the ability of the Texture function to discriminate between different regions for the purpose of data compression will be severely compromised.

The final step in the computation of RowTexture is to take the sum of the absolute values of the differences between successive values of q(i). In equation form RowTexture=Σ[abs(q(i+1)−q(1))]. The ColTexture function is defined in precisely the same way, except that it uses pixel values along a column rather than along a row.

Figure 3:
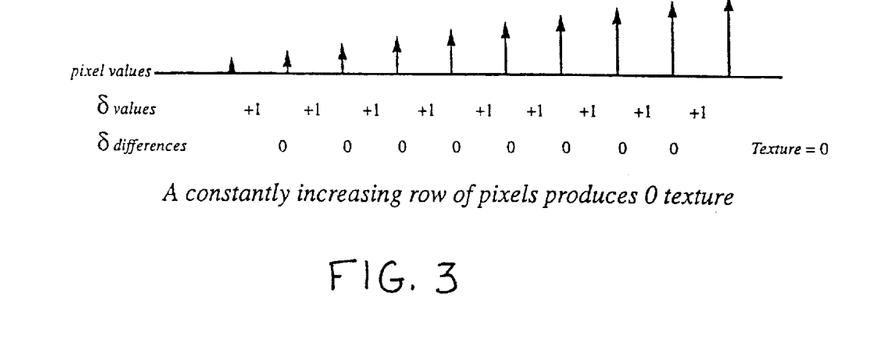
FIG. 3 illustrates texture and $\delta$ values for a constantly increasing row of pixels.
Figure 4:
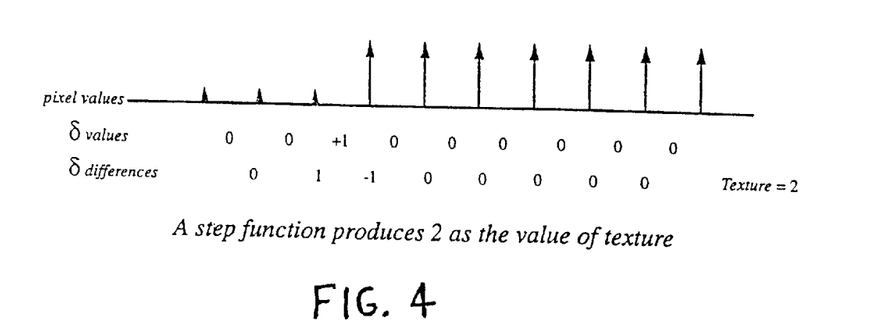
FIG. 4 illustrates texture and δ values for pixel changes forming a step function.
Figure 5:
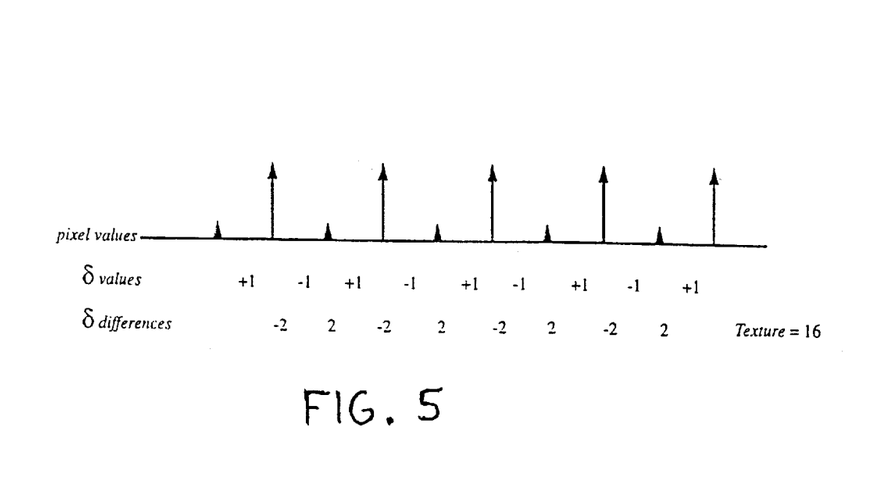
FIG. 5 illustrates texture and δ values for alternating pixel values.

The reasoning for providing RowTexture and ColTexture is that they compute the number of significant pixel to pixel changes along a row or column respectively. A change is deemed significant only if it is larger than some threshold and if it is different from the immediately preceding value of the thresholded change. Thus a row or column consisting of constant pixel values or constantly increasing or constantly decreasing pixel values will produce a 0 value of texture as illustrated in FIG. 3. FIG. 3 shows a constantly increasing row of pixels with δ values, δ differences and texture calculated for the row. FIG. 4 illustrates a row or column with pixel changes forming a step function with the step being larger than ε to provide a texture value of 2. FIG. 5 further illustrates a row or column with alternating pixel values a, b, a, b . . . producing the largest value of texture as long as the magnitude of (b−a)>ε. The largest value for a row or column containing 12 pixels will then be 20.

By reviewing the Texture function it is clear why the Texture function for a pixel block produces the smallest values for Flat regions, slightly higher values for Contone regions containing no sharp edges, still higher values for Lineart regions, and the highest values for Halftone regions.

II. Tag Computation

The tags are used to identify different data regions to guide image compression. Tags are determined by looking at a limited window of pixels in the image around the pixel for which the current tag is being produced. To reduce memory required, only one tag for each n×n pixel block (PIBL) in the image is identified rather than one tag per pixel (n preferably being 8). The pixels examined to compute the tag for a given 8×8 PIBL include the 64 pixels of the PIBL and potentially some surrounding pixels. If the context pixels are chosen symmetrically, the pixels examined form a square block of size k×k where k>n. The k×k pixel block containing the n×n PIBL and surrounding contest pixels is referred to herein as a FatPIBL. The tag is nominally a 4-bit number capable of encoding 16 distinct category names, but it may be chosen to be smaller or larger.

Figure 6:
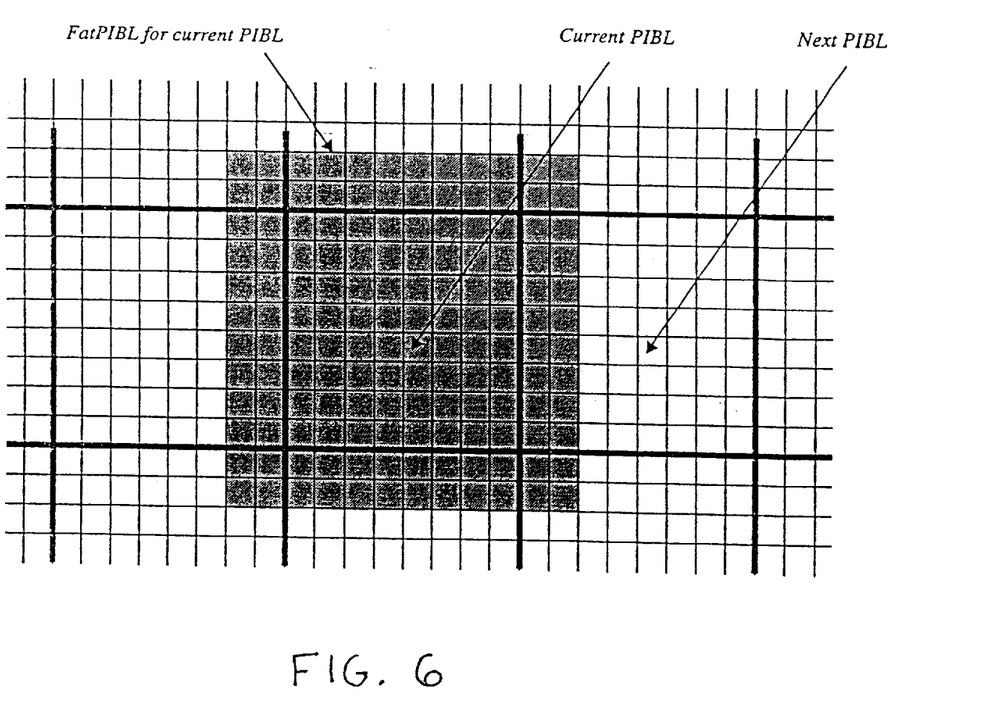
FIG. 6 illustrates defining regions of image data into pixel blocks (PIBLs) for assigning tag values.

FIG. 6 illustrates defining regions of image data for assigning tag values. The image of FIG. 6 is shown tiled by the thicker lines into 8×8 PIBLs. The tag for a given PIBL is computed by using the pixels in a slightly larger k×k (k=12) pixel block shown by the shaded area that contains the 8×8 PIBL. A tag value can be determined from the texture function, as described previously, other functions such as contrast or relative contrast, as described below, or a combination of functions.

A contrast function is defined as the difference between the largest and smallest pixel values in a FatPIBL. FatPIBLs in a Flat region typically have the lowest contrast. FatPIBLs in a Contone region have somewhat higher contrast, FatPIBLs in a Halftone region have still higher contrast, and FatPIBLs in a Lineart region have the highest contrast.

A relative contrast function provides an independent method of discriminating between halftones and lineart. The relative contrast function takes into account the fact that halftones are small in two dimensions, whereas lineart is typically small in only one dimension. As a result, if an image containing both lineart and halftones is blurred, the contrast of halftones is reduced by a greater amount than the contrast of lineart.

Figure 7:
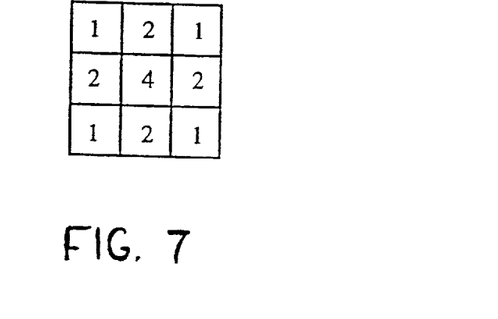
FIG. 7 shows a 3×3 filter.

Relative contrast is determined by first computing contrast, as described above, or the difference between the maximum and minimum pixel values of the FatPIBL. Next the source FatPIBL is blurred using a 3×3 filter shown as shown in FIG. 7. The exact filter, however is not critical as long as the effect is to blur the image. Referring to the filter of FIG. 7, the filter is applied by multiplying the value for the pixel being filtered by the center value, here 4, multiplying the pixel values of the pixels surrounding the pixel being filtered by the corresponding surrounding filter values, and then adding the total to provide a new value for the pixel being filtered. Because the pixels at the edges of the 12×12 FatPIBL will not have sufficient surrounding pixels for filtering, they are not considered in the filtering process, so the result of the filter operation will produce a 10×10 block. The blurred contrast is then computed as the difference between the maximum and minimum pixel values of the 10×10 block. Relative contrast is then computed as (255*Blurred Contrast/Contrast). With the contrast value limited to less than 255, the relative contrast will be between 0 and 255 since blurred contrast will always being less than Contrast.

A TCR map can be created from a combination of the Texture, Contrast and Relative Contrast functions to determine a tag value. The TCR map is simply a three dimensional plot showing the relative frequency of different values of (t, c, r) in the image, where t, c and r identify Texture, Contrast and Relative Contrast values respectively.

Figure 8:
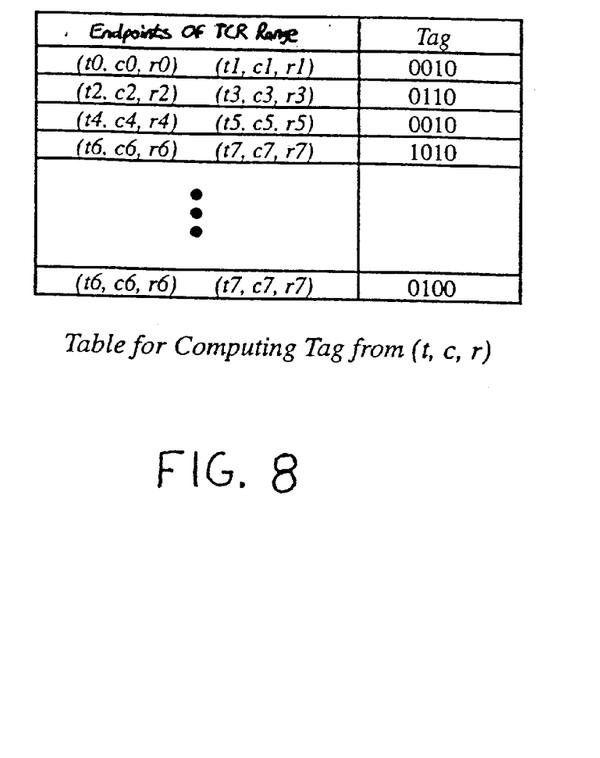
FIG. 8 shows a segmentation tag look up table.

When rules are set to determine a tag value based on a TCR map, large contiguous volumes in TCR space will have the same value of tag. To exploit the continuity to identity tags, segmentation look up tables can be provided as shown in FIG. 8. The extent of each range of TCR tags is defined by two triples, such as (t0, c0, r0) and (t1, c1, r1). Each cell then has a 4 bit tag which is the tag value associated with all the points that lie in the cell. Given a particular (t,c,r) value for a PIBL, the tag for the PIBL is determined by searching the table from the beginning and outputting the tag corresponding to the cell that contains the given point.

III. Prefiltering

In accordance with the present invention, once PIBLs are identified, texture values are determined, tags are assigned and then prefiltering is applied. Prefiltering is performed according to the category of the image region identified by the tag values.

A. Lineart Prefiltering

A first type of prefiltering is applied to Lineart blocks. For prefiltering, Lineart is divided into PIBLs of image data are conditioned for compression using a series of steps as described to follow.

In a first step, the texture value for the pixel elements scanned from each row of the PIBL are calculated as identified previously. A data array is then stored which includes the texture value for each row. Assuming an 8×8 PIBL, there are 8 rows, referred to as row[0:7], the array storing the row texture values is referred to herein as xTexture[8].

In a second step, the texture value for the pixel elements scanned from each column of the PIBL are calculated. A data array is then stored which includes the texture value for each column. Assuming there are 8 columns, referred to as column[0:7], the array storing the column texture values is referred to herein as yTexture[8].

In a third step, for each row of a PIBL, one of three filters is selected using the xTexture value for the individual row. A function is used to map texture to a filter so that the lowest textures result in a smoothing filter, the highest textures result in a sharpening filter, and for textures in between no filtering is performed. Details of the filter sizes and weights are not critical. Only the notion that different filtering is performed based on the combination of coarse block segmentation and fine pixel resolution local properties.

In a fourth step, for each column of a PIBL, one of three filters is selected using the yTexture value for the individual column. Again, a function is used to map the texture to a filter so that the lowest textures result in a smoothing filter, the highest textures result in a sharpening filter and for textures in between, no filtering is performed. Details of the filter sizes and weights are not critical, and different filters can be used for the xTexture and yTexture values to reflect a difference in X and Y scanning resolution.

An example of Texture filters which may be used in the third and fourth steps is as follows:

| Texture | X-Filter | Y-Filter |
|---|---|---|
| ≤1 | 1 2 1 | 1 2 1 |
| >1 & ≤5 | 0 1 0 | 0 1 0 |
| >5 | −1 4 −1 | −1 6 −1 |

The X-Filter and Y-Filter are different to reflect a difference in X and Y scanning resolution.

For the three wide filters of the example above, and other filter values, computing the filtered row and column values requires access to context pixels at the left and right edges of the PIBL. The filters are applied by multiplying the value for the pixel being filtered by the center filter value, multiplying the pixel values of the pixels surrounding the pixel being filtered by the corresponding surrounding filter values, and then adding the total to provide a new value for the pixel being filtered. Because the pixels at the edges of the PIBL will not have sufficient surrounding pixels for filtering, context pixels surrounding the PIBL edges can be used for the filtering process. The number of context pixels needed will be a function of filter size. For the three wide filters of the example above, one context pixel will be needed at each edge of a row or column to form additional texture values for the rows or columns. For example, if the PIBL is an 8×8, then the context pixels needed with the 8×8 PIBL will create a 10×10 PIBL.

Once prefiltering is performed for the Lineart blocks, the data is passed into a data compression algorithm for the Lineart blocks.

B. Toneart Prefiltering

A second type of prefiltering is applied to Toneart. Toneart includes both Contone and Halftone regions, but excludes Lineart. For prefiltering, Toneart is divided into PIBLs of image data and conditioned for compression using a series of steps as described below, as opposed to the prefiltering steps for Lineart.

In a first step, a FatPIBL containing a PIBL and context pixels is filtered using a filter, where the filter size requires use of the context pixels. The filter used may be uniform for the X and Y direction, or separable. The filter is applied to a pixel if context pixels surrounding the pixel being filtered are available. After filtering the blurred result is reexpanded to the original FATPIBL size by copying the original pixels from the FATPIBL which are not filtered in the original result. A blurred FATPIBL result is then provided which contains filtered and context pixels for further processing if needed.

For example, assume the FATPIBL is a 12×12 block surrounding an 8×8 PIBL. Further assume that the filter used is a three wide filter 3 2 3. The result produced after filtering is a 10×10 blurred block. Expanding the 10×10 block by copying corresponding pixels from the original 12×12 FATPIBL then produces a 12×12 result. The 12×12 blurred result contains a resulting 8×8 PIBL and 2 pixels of context surrounding it.

Figure 9:
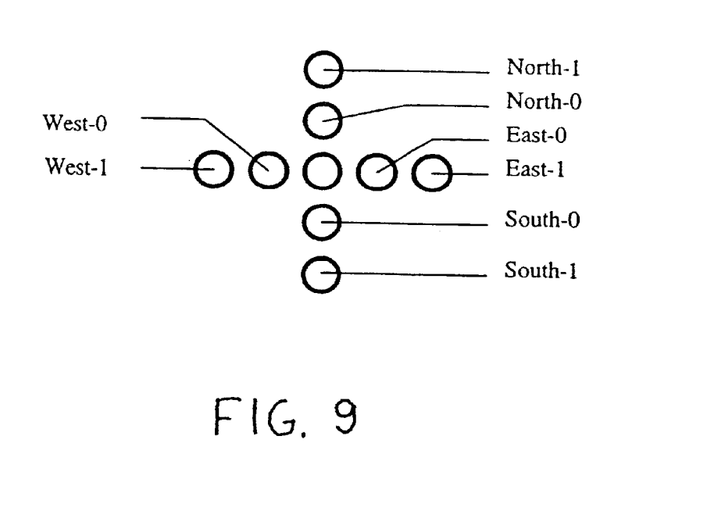
FIG. 9 illustrates neighboring North, South, East and West pixel values used in toneart prefiltering.

In a second step for each element of the resulting PIBL after filtering (hereafter the filtered PIBL), the average of its 4 pair of neighborhood values is computed. The neighboring values include a pair to each of the North, South, East and West, as illustrated in FIG. 9. For example, to calculate the average value for pixels to the North, the following calculation is performed: North=(North0+North1)/2. Similar calculations are performed to the values in the South, East and West.

In a third step, for each element of the filtered PIBL, a first mask bit is set if the absolute value of the average West minus the average East value |West−East| exceeds a predetermined threshold. The first mask bit will be referred to as an "X-mask" buffer bit.

In a fourth step, for each element of the filtered PIBL, its X-mask bit is set if either its left or right neighbor had a mask bit set by the third step.

In a fifth step, for each element of the filtered PIBL, a second mask bit is set if the absolute value of the average North minus the average South value |North−South| exceeds a predetermined threshold. The second mask bit will be referred to as a "Y-mask" buffer bit.

In a sixth step, for each element of the filtered PIBL, its Y-mask bit is set if either its top or bottom neighbor had a mask bit set by the fifth step.

In a seventh step, for each element of the filtered PIBL, its X-mask bit and Y-mask bit are ORed together to provide a filter control mask bit.

In an eighth step, a smoothing filter is applied to the original FATPIBL including all of its PIBL and context to create a temporary filtered block. An algorithm for smoothing is described in text to follow.

In a ninth step, a final prefiltered output block is computed by using the filter control mask bits to select the value from the original FATPIBL block when the mask bit is set, and from the temporary block when the mask bit is not set.

IV. Smoothing

A smoothing algorithm can do at least two things. First, it removes the "salt and pepper" noise from the input tag image. Second, it can resolve ambiguities between tags used to characterize a PIBL as a Contone (CT), Halftone (HT), Flat (FT) or Lineart (LA) image.

Figure 10:
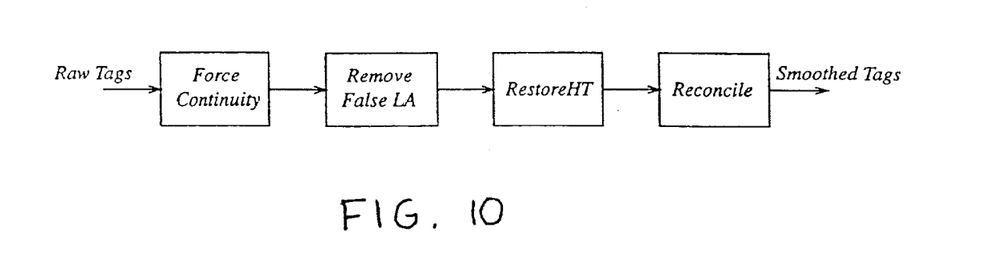
FIG. 10 illustrates a four phase smoothing algorithm process.

One example of a smoothing algorithm operates in four phases, with the output of each phase feeding the next. The first phase forces continuity separately for each of the HT, CT, and FT regions. In this first phase each of the HT, CT and FT regions is operated on independently of the others. The second phase removes false occurrences of LA, which occur typically along the border of HT or CT regions. The third phase restores any HTs that may have been erroneously removed by the first phase. The final phase reconciles the output bits for each tag to ensure a legal unambiguous value. FIG. 10 illustrates the four phase smoothing algorithm process.

Figure 11:
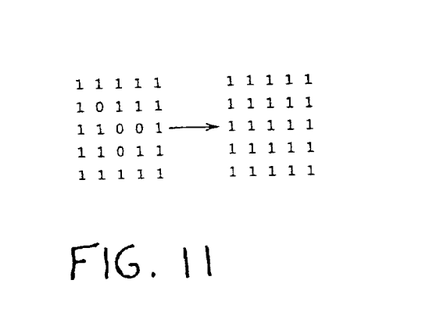
FIGS. 11, 12 and 13 show examples of the effect of processes for removing isolated zeros on blocks of pixels containing different clusters of zeros.
Figure 12:
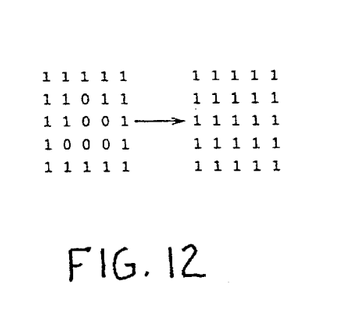
Figure 13:
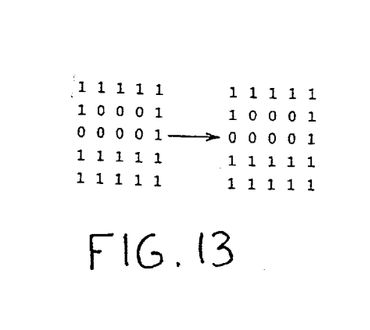

The first continuity phase operates independently on the bits corresponding to FT, CT and HT. The processing of these regions can be described in terms of two generic bitmap filtering regions termed Remove Isolated Zeros (RIZs) and Remove Isolated Ones (RIO). Two variations of the RIZ and RIO functions are available. The first variation removes a feature (either a group of zeros or ones) if the feature's dimension in x or y is less than or equal to N. The first variation operations are termed $RIZ_1$ (N) and $RIO_1$ (N). The subscript 1 indicates that features less than N in 1 dimension are removed. The second variation removes features that fit in an N×N square. The second variation operations are termed $RIZ_2$ (N) and $RIO_2$ (N). The subscript 2 indicates that features less than N in 2 dimensions are removed. FIGS. 11, 12 and 13 show examples of the effect of $RIZ_2(3)$ on three clusters of zeros.

$RIZ_1(N)$ and $RIO_1(N)$ are implemented using separate 1-D filtering operations in the x and y directions. For $RIZ_1(N)$ the filter operation is OR, the filter coefficients are all 1 s, and the filter width is N. For $RIO_1(N)$ the filter operation is AND, the filter coefficients are all 1s, and the filter width is N. Implementation of $RIZ_2(N)$ and $RIO_2(N)$, however, cannot be done using images separable in the x and y dimensions, and must be implemented with filters in the x and y directions taken in relation to each other.

The first force continuity phase is implemented by performing $RIZ_1(3)$ on the FT PIBLs and by leaving the CT and HT PIBLs untouched. A more sophisticated scheme would operate on the CT and HT PIBLs as well, and would use the dimensional operator $RIZ_2$ (N) to avoid erasing thin lines made up of HT or CT.

To remove false LA in the second phase, PIBLs which are tagged as both FT and LA which are on the border of being FT PIBLs are set to LA only by clearing the FT tag bit.

In the third restoration phase, which is set to restore HT features, HT features that were erased during the first continuity phase are restored. Restoration is accomplished by setting the LA tag bit for those PIBLs that were converted from HT to FT. The third phase is useful for preserving information in small segments of the PIBLs, such as small halftoned text which typically appears as HT, and which would be essentially wiped out if the conversion from LA to FT were left unchecked.

The fourth reconciliation phase is next accomplished. If in a given tag FT is set, then both CT and HR are cleared. If FT is not set and both CT and HT are set, then one of the CT or HT is cleared depending on which one occurs less frequently. If all three tag bits for FT, CT, and HT are 0, and LA is set, then HT is set. If FT, CT and HT are 0, and LA is not set, then FT is set. The fourth step completes the smoothing algorithm.

Although the present invention has been described above with particularity, this was merely to teach one of ordinary skill in the art how to make and use the invention. Many additional modifications will fall within the scope of the invention, as that scope is defined by the claims which follow.

What is claimed is:

1. A method for prefiltering scanned image pixel data, wherein scanned pixel data is divided into pixel blocks (PIBLs), and steps of the method for prefiltering are applied to the PIBLs, the method of prefiltering a given one of the PIBLs comprising the steps of:

filtering the pixels of the given PIBL to create a blurred PIBL;

computing the average of the two neighboring pixel values in each direction from each pixel of the blurred PIBL, the average for each direction being referred to as North, South, East and West values respectively;

setting a first threshold bit (X_Mask) for each pixel of the blurred PIBL if an absolute value of the East value minus the West value for the respective pixel exceeds a fist threshold (TA);

setting the first threshold bit (X_Mask) for each pixel of the blurred PIBL if the first threshold bit for a neighboring pixel to the East or the West has its said first threshold bit set;

setting a second threshold bit (Y_Mask) for each pixel of the blurred PIBL if an absolute value of the North value minus the South value for the respective pixel exceeds a second threshold (TB)

setting the second threshold bit (Y_Mask) for each pixel of the blurred PIBL if the first threshold bit for a neighboring pixel to the North or the South has its said second threshold bit set;

OR-ing together the first threshold bit (X_Mask) and the second threshold bit (Y_Mask) for each pixel of the blurred PIBL and providing a result in a filter control mask bit for each respective pixel of the blurred PIBL;

creating a temporary block of pixels by applying a smoothing filter to the given PIBL; and creating an output block by copying a value for a pixel of the final output block from a value of a corresponding pixel from the given PIBL when the control mask bit for the corresponding pixel in the blurred PIBL is set, and copying a value for a pixel of the final output block from a value of a corresponding pixel from the temporary block when the control bit mask forte corresponding pixel in the blurred PIBL is not set.

2. A method for prefiltering scanned image data, dividing said scanned data into pixel blocks (PIBLs), wherein said PIBLs comprise rows and columns, individually prefiltering each said PIBL according to a method including the steps of;

applying steps (a–f) if a tag forte PIBL indicates that the PIBL contains lineart, wherein steps (a–f) comprise:
  (a) computing a texture value for each row of the given PIBL and storing results in a first array (xTexture);
  (b) computing a texture value for each column of the given PIBL and storing the results in a second array (yTexture);
  (c) selecting a row filter for each row of the given PIBL based on the texture value results in the first array (xTexture);
  (d) filtering the pixels of each of the rows with the corresponding selected row filter;
  (e) selecting a column filter for each column of the given PIBL based on the texture value results in the second ray (yTexture); and
  (f) filtering the pixels of each of the columns wit the corresponding selected column filter; and applying steps (g–o) if the tag for the PIBL indicates that the PIBL contains toneart, wherein steps (g–o) comprise:
  (g) filtering the pixels of the given PIBL to create a blurred PIBL;
  (h) computing the average of the two neighboring pixel values in each direction from each pixel of the blurred PIBL, the average for each direction being referred to as North, South, East and West values respectively;
  (i) setting a first threshold bit (X_Mask) for each pixel of the blurred PIBL if an absolute value of the East value minus the West value computed for the respective pixel exceeds a first threshold (TA);
  (j) setting the first threshold bit (X_Mask) for each pixel of the blurred PIBL if the first threshold bit for a neighboring pixel to the East or the West has its said first threshold bit set;
  (k) setting a second threshold bit (Y_Mask) for each pixel of the blurred PIBL if an absolute value of the North value minus the South value for the respective pixel exceeds a second threshold (TB)
  (l) setting the second threshold bit (Y_Mask) for each pixel of the blurred PIBL if the first threshold bit for a neighboring pixel to the North or the South has its said second threshold bit set;
  (m) OR-ing together the first threshold bit (X_Mask) and the second threshold bit (Y_Mask) for each pixel of the blurred PIBL and providing a result in a filter control mask bit for each respective pixel of The blurred PIBL;
  (n) creating a temporary block of pixels by applying a smoothing fillet to the given PIBL; and
  (o) creating an output block by copying a value for a pixel of the final output block from a value of a corresponding pixel from the given PIBL when the control mask bit for the corresponding pixel in the blurred PIBL is set, and copying a value for a pixel of the final output block from a value of a corresponding pixel from the temporary block when the control bit mask for the corresponding pixel in the blurred PIBL is not set.

* * * * *